United States Patent
van Rotterdam et al.

(10) Patent No.: US 9,164,751 B2
(45) Date of Patent: Oct. 20, 2015

(54) SYSTEM AND METHOD OF ROLLING UPGRADES OF DATA TRAITS

(75) Inventors: Jeroen van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 13 days.

(21) Appl. No.: 13/250,992

(22) Filed: Sep. 30, 2011

(65) Prior Publication Data

US 2013/0086015 A1 Apr. 4, 2013

(51) Int. Cl.
G06F 17/00 (2006.01)
G06F 9/44 (2006.01)
G06F 9/445 (2006.01)
G06F 17/30 (2006.01)

(52) U.S. Cl.
CPC ............ *G06F 8/65* (2013.01); *G06F 17/30309* (2013.01)

(58) Field of Classification Search
CPC .............................. G06F 17/30309; G06F 8/65
USPC ......... 707/695, 694, 999.1, 999.203; 717/171
See application file for complete search history.

(56) References Cited

U.S. PATENT DOCUMENTS

| | | | | |
|---|---|---|---|---|
| 6,138,119 A * | 10/2000 | Hall et al. | ............................ | 1/1 |
| 6,209,128 B1 * | 3/2001 | Gerard et al. | .................. | 717/108 |
| 6,237,003 B1 * | 5/2001 | Lewish et al. | ......................... | 1/1 |
| 7,055,147 B2 * | 5/2006 | Iterum et al. | ................... | 717/170 |
| 7,099,896 B2 * | 8/2006 | Fields et al. | ........................... | 1/1 |
| 7,359,907 B2 * | 4/2008 | MacLeod et al. | ..................... | 1/1 |
| 7,401,085 B2 | 7/2008 | Mackay et al. | | |
| 7,493,335 B2 * | 2/2009 | Gold et al. | ............................ | 1/1 |
| 7,496,596 B2 * | 2/2009 | Li et al. | ................................ | 1/1 |
| 7,587,432 B2 | 9/2009 | Pauly et al. | | |
| 7,730,028 B2 * | 6/2010 | Tysowski et al. | ............. | 707/610 |
| 7,747,588 B2 * | 6/2010 | Thompson et al. | ........... | 707/694 |
| 7,792,800 B1 | 9/2010 | Carson, Jr. et al. | | |
| 7,814,067 B2 | 10/2010 | Souder et al. | | |
| 7,853,621 B2 * | 12/2010 | Guo | .............................. | 707/803 |
| 7,904,418 B2 * | 3/2011 | Agrawal et al. | ............... | 707/610 |
| 7,930,691 B2 * | 4/2011 | Bhattacharya et al. | ........ | 717/171 |
| 7,953,696 B2 * | 5/2011 | Davis et al. | .................... | 707/608 |
| 8,019,737 B2 | 9/2011 | Kocsis et al. | | |
| 8,095,517 B2 | 1/2012 | Sandoval et al. | | |
| 8,166,101 B2 | 4/2012 | Shah | | |
| 8,195,621 B2 | 6/2012 | Elisha et al. | | |
| 8,214,329 B2 | 7/2012 | Gilder et al. | | |
| 8,250,119 B2 * | 8/2012 | Zazrivec et al. | ............. | 707/806 |
| 8,255,790 B2 * | 8/2012 | Francker et al. | .............. | 715/221 |
| 8,307,016 B2 * | 11/2012 | Szyperski et al. | ............ | 707/809 |
| 8,341,594 B1 * | 12/2012 | Monteiro et al. | ............. | 717/105 |

(Continued)

OTHER PUBLICATIONS

EMC Corporation, "Documentum Architecture Part 2: moving to the public cloud", presentation date: May 9, 2011.

(Continued)

*Primary Examiner* — Miranda Le
(74) *Attorney, Agent, or Firm* — Van Pelt, Yi & James LLP

(57) ABSTRACT

A method, article of manufacture, and apparatus for managing a computing environment, such as a cloud data repository. In some embodiments, this includes modifying an object or a component of an object at runtime and storing the modified object or modified component of an object in a storage device. In some embodiments, the component of an object modified may include traits. In some embodiments, objects or traits may have more than one version.

17 Claims, 16 Drawing Sheets

(56) References Cited

U.S. PATENT DOCUMENTS

| | | | |
|---|---|---|---|
| 8,370,474 B1 | 2/2013 | Reeves et al. | |
| 8,386,423 B2 | 2/2013 | Parham et al. | |
| 8,452,817 B1* | 5/2013 | Srinivasan et al. | 707/803 |
| 2001/0048728 A1* | 12/2001 | Peng | 375/354 |
| 2002/0169777 A1* | 11/2002 | Balajel et al. | 707/10 |
| 2004/0162885 A1* | 8/2004 | Garg et al. | 709/213 |
| 2004/0172462 A1* | 9/2004 | Iterum et al. | 709/223 |
| 2005/0120061 A1* | 6/2005 | Kraft | 707/203 |
| 2006/0085451 A1* | 4/2006 | Pal et al. | 707/100 |
| 2006/0117057 A1* | 6/2006 | Legault et al. | 707/102 |
| 2006/0195460 A1* | 8/2006 | Nori et al. | 707/100 |
| 2006/0259458 A1* | 11/2006 | Hunter et al. | 707/2 |
| 2007/0094310 A1 | 4/2007 | Passey et al. | |
| 2008/0052325 A1* | 2/2008 | Vincent, III | 707/203 |
| 2008/0098037 A1* | 4/2008 | Neil et al. | 707/200 |
| 2008/0168109 A1* | 7/2008 | Gaurav et al. | 707/203 |
| 2009/0276660 A1* | 11/2009 | Griffith et al. | 714/16 |
| 2009/0307278 A1* | 12/2009 | Grossbart et al. | 707/203 |
| 2010/0049724 A1* | 2/2010 | Canessa et al. | 707/100 |
| 2010/0058169 A1* | 3/2010 | Demant et al. | 715/234 |
| 2010/0185701 A1 | 7/2010 | Ramamurthi et al. | |
| 2011/0145195 A1* | 6/2011 | Passey et al. | 707/638 |
| 2011/0307524 A1 | 12/2011 | Aitken et al. | |
| 2012/0226658 A1* | 9/2012 | Connor | 707/609 |
| 2012/0317033 A1* | 12/2012 | Heidasch | 705/51 |

OTHER PUBLICATIONS

Galante R D M et al: "Temporal and versioning model for schema evolution in object-oriented databases", Data & Knowledge Engineering, Elsevier BV, NL, vol. 53, No. 2, May 1, 2005, pp. 99-128, XP027783935, ISSN: 0169-023X [retrieved on May 1, 2005].

* cited by examiner

```xml
<?xml version="1.0" encoding="UTF-8"?>
<document xmlns="http://www.emc.com/ngis/core/typesystem/def"
xmlns:xlink="http://www.w3.org/1999/xlink"
objectID="0000000000008004">
   <myapp:content xmlns:myapp="http://www.example.com/" typename="content " typenamespace="http://www.emc.com/ngis/traits/base" version="1">
      <content version="1">
         <mimetype>application/pdf</mimetype>
         <size>200000</size>
         <fileref xlink:href="link/to/some/file/here"/>
         <filename>junglebook.pdf</filename>
      </content>
   </myapp:content>
   <yourapp:authoring xmlns:yourapp="http://www.test.com/" typename="authoring" typenamespace="http://www.emc.com/ngis/traits/base" version="1">
      <authoring version="2">
         <lastModifiedDate>2006-05-04T18:13:51.0Z</lastModifiedDate>
         <lastModifier xlink:href="0000000000000000"/>
         <creationDate>2006-05-04T18:13:51.0Z</creationDate>
         <creatorRef xlink:href="http://www.oxygenxml.com/"/>
      </authoring>
   </yourapp:authoring>
</document>
```

FIG. 1

```xml
<?xml version="1. 0" encoding="UTF- 8"?type-definition>
xmlns="http://www.emc.com/documentum/cs/core/typesystem/def"
xmlns:xlink="http://www.w3.org/1999/xlink" version="1"
    objectID="0000000000009006">
  <type-definition version="1">
    <name>document</name>
    <definition-version>1</definition-version>
    <namespace>http://www.emc.com/typesystem/def</namespace>
    <class-configuration>com.objects.core.Document</class-configuration>
    <events>
      <event name= "Create">
        <trait namespace="http://www.emc.com/documentum/cs/core/typesystem/def" name="Authoring"/>
        <trait namespace="http://www.emc.com/documentum/cs/core/typesystem/def" name="Content"/>
        < . -- ... -->
      </event>
      <event name= "Delete">
        <trait namespace="http://www.emc.com/documentum/cs/core/typesystem/def" name="Content"/>
        <trait namespace="http://www.emc.com/documentum/cs/core /typesystem/def" name="Authoring"/>
        < . -- ... -->
      </event>
    </events>
  </type-definition>
</type-definition>
```

FIG. 2

```xml
<?xml version="1.0" encoding="UTF-8"?><trait-definition
xmlns= "http://www.emc.com/documentum/cs/core/typesystem/def"
xmlns:xlink="http://www.w3.org/1999/xlink" version="2"
    objectID="00000000000008010">
  <trait-definition version= "1">
    <name>authoring</name>
<namespace>http://www.emc.com/documentum/cs/core/typesystem/def</namespace>
    <definition-version>2</definition-version>
    <class-configuration>com.emc.documentum.cs.core.typesystem.impl.AuthoringImpl</class-configuration>
    <upgrade when="inBackground"/>
    <events>
      <event name="Create" handler= "com.emc.documentum.cs.core.typesystem.impl.CreateHandler"/>
      <event name="Delete" handler= "com.emc.documentum.cs.core.typesystem.impl.DeleteHandler"/>
      <event name="Update" handler= "com.emc.documentum.cs.core.typesystem.impl.UpdateHandler"/>
      <event name="Upgrade" handler="com.emc.documentum.cs.core.typesystem.impl.AuthoringUpgradeToVersion2"/>
    </events>
    <root-element>authoring</root-element>
  </trait-definition>
</trait-definition>
```

FIG. 4

```xml
<?xml version="1.0" encoding="UTF-8"?>
<xs:schema elementFormDefault="qualified"
xmlns ="http://www.emc.com/documentum/cs/core/typesystem/def"
xmlns:xs="http://www.w3.org/2001/XMLSchema"

targetNamespace="http://www.emc.com/documentum/cs/core/typesystem/def
"xmlns:xlink="http://www.w3.org/1999/xlink">
 <xs:include schemaLocation=".. /core.xsd"/>
 <xs:complexType name="Authoring">
   <xs:complexContent>
     <xs:extension base="RootTrait">
       <xs:sequence>
         <xs:element name="authors" minOccurs="0">
           <xs:complexType>
             <xs:sequence>
               <xs:element name="author" maxOccurs= "unbounded">
                 <xs:complexType>
                   <xs:choice>
                     <xs:element name="user" type="UserRef"/>
                      <xs:element name="person">
                        <xs:complexType>
                          <xs:group ref="personGroup"/>
                        </xs:complexType>
                      </xs:element>
                   </xs:choice>
                 </xs:complexType>
               </xs:element>
             </xs:sequence>
           </xs:complexType>
         </xs:element>
         <xs:element name="lastModifiedDate" type="xs:dateTime" minOccurs= "0"/>
            <xs:element name="lastModifier" minOccurs="0">
              <xs:complexType>
                <xs:sequence>
```

FIG. 7

```
              <xs:element name="user" type="UserRef"/>
            </xs:sequence>
          </xs:complexType>
        </xs:element>
        <xs:element name="creationDate" type="xs:dateTime"minOccurs= "0"/>
        <xs:element name="creator" minOccurs="0 ">
          <xs:complexType>
            <xs:sequence>
              <xs:element name="user" type="UserRef"/>
            </xs:sequence>
          </xs:complexType>
        </xs:element>
      </xs:sequence>
    </xs:extension>
  </xs:ComplexContent>
</xs:ComplexType>

<xs:element name="authoring" type="Authoring"/>
</xs:schema>
```

FIG. 7(Cont.)

SYSTEM AND METHOD OF ROLLING UPGRADES OF DATA TRAITS

CROSS REFERENCE TO RELATED APPLICATIONS

This application is related to co-pending U.S. patent application Ser. No. 13/251,175 for SYSTEM AND METHOD OF DYNAMIC DATA OBJECT UPGRADES and filed concurrently herewith, which is incorporated herein by reference for all purposes.

FIELD OF THE INVENTION

This invention relates generally to data systems, and more particularly to systems and methods for organizing and upgrading data in data systems.

BACKGROUND OF THE INVENTION

Increasingly, there is a demand for increasing availability and uptime of systems for the storage, warehousing, and analysis of data.

Frequently, when changes are required to a data system, such as a database, and particularly when changes are required to the manner in which data is stored or organized, or additions are made to the format of data, the system must be taken offline, brought down, or otherwise temporarily made unavailable to users. For example, if a database schema needs to be updated or upgraded, this has typically required downtime for the entire data repository.

Users desiring access to the data system are frustrated by the unavailability of the data system, for example, they frequently need access to the data system to perform their job responsibilities. Downtime is particularly problematic for distributed and "cloud"-based repositories, as it is difficult for cloud providers to schedule downtime acceptable to all their customers or users, for example. More generally, most customers of cloud-based services and data systems, and particularly enterprise customers, may expect substantially continuous availability with virtually no downtime.

There is a need, therefore, for an improved method, article of manufacture, and apparatus for making changes to the organization of data in data systems, and for making additions to the data stored in data systems, while minimizing if not eliminating the amount of time that the system is unavailable to users.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates a data object in accordance with some embodiments.

FIG. 2 illustrates a data type definition in accordance with some embodiments.

FIG. 4 illustrates a trait definition in accordance with some embodiments.

FIG. 7 illustrates a scheme for an authoring trait in accordance with some embodiments.

DETAILED DESCRIPTION

Figure 3:
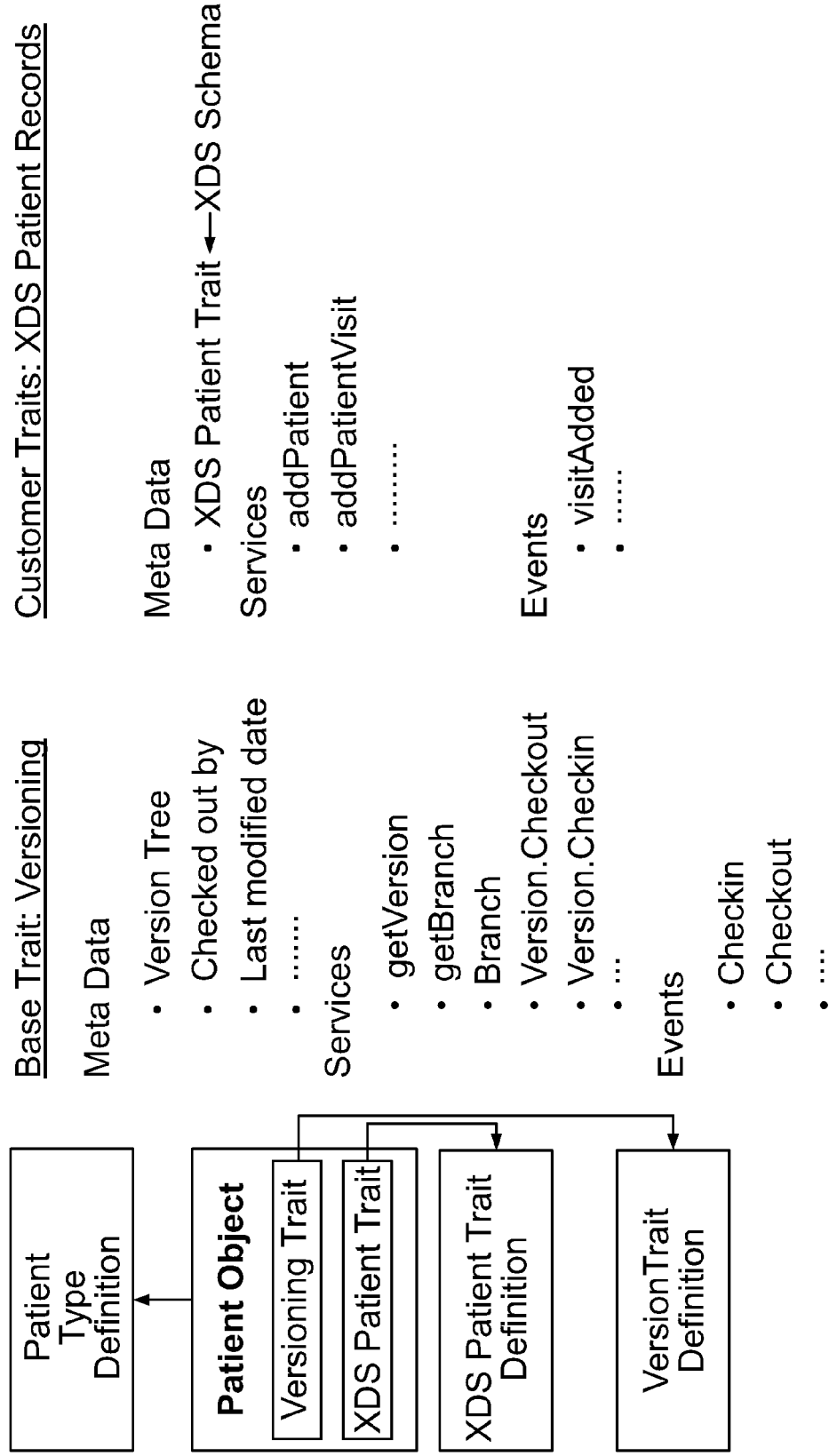
FIG. 3 illustrates an object in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard-coded in hardware or in firmware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, and particularly data objects, in analog, digital, or other form. Although terms such as document, file, object, etc. may be used by way of example, the principles of the invention are not limited to any particular form of representing and storing data or other information; rather, they are equally applicable to any manner of representing information. Similarly, while reference may be made herein to a database, data system, document storage system, data repository, or similar systems or data collections; reference to one type of these systems should be taken to refer to all such suitable systems unless explicitly stated otherwise.

Traditional databases, or content management systems, have relatively rigid definitions of data objects. Conventional data objects provided or used with such databases or systems typically inherit lots of metadata and functionality, even if much of this metadata and functionality not required or used. Moreover, total cost of ownership per object is relatively high, and the offered functionality is generally inflexible and unchangeable.

Embodiments of the invention herein allow for the updating, upgrading, or other amendment or modification (generally herein, "updating") of data structures, or for the updating of policies for data structures, on the fly, without taking the data system down or offline. In certain embodiments, developers may be allowed to choose an update policy for an individual object. In other embodiments, a developer may be allowed to choose an update policy for a set of objects. Alternatively, in certain embodiments, a developer may be allowed to choose an update policy for an entire repository. In some embodiments, the data model change, or upgrade of the selected object(s), is executed while the system continues operation and thus the system remains available to users without material interruption.

Embodiments of the present invention provide a way to dynamically change or upgrade databases with persistent objects, based on policies. Further embodiments of the invention provide a system to set policies for upgrade objects "on the fly," without taking the database offline for upgrading. These policies allow developers to choose an upgrade policy appropriate for the situation, for example, an upgrade may be applied for an individual object. Alternatively, an upgrade may be applied to a set of objects. In some embodiments and uses, an upgrade may be applied to an entire data repository; the data model change or upgrade of the selected object(s) being executed while the system continues operation. In this manner, embodiments of the present invention allow for continuous operation of applications even if the data structures used by the application and data repository need to change, e.g. such data structures may require changes because of a corresponding change in a business process, and correspondingly in an application based on this business process, that accesses such data structures.

The enhanced techniques described herein allow for dynamic definitions of data objects, or subsidiary data structures or characteristics, as described in greater detail in co-owned and co-pending U.S. patent application Ser. No. 13/174,746, for DYNAMIC DATA STRUCTURES, filed Jun. 30, 2011; such application is incorporated herein by reference for all purposes.

As described in such application, a data object may be implemented in the form of an XML document. For example, a "document" object may be created, in some embodiments relating to a scanned paper document, a data file, or some other actual, virtual, or electronic document or file. This object of type "document" may be given traits, for example by the appropriate provision of tags in the XML document. In some embodiments, rather than "traits," data aspects, or other cross-cutting or multi-object data structures or attributes may be associated with a data object (referred to collectively herein as "traits"), for example by implementation in an XML document. These data objects, with their associated traits, may be conveniently stored in an object-oriented or other database, for example one optimized for storage of XML documents if the objects or traits are implemented in such documents. The xDB databases distributed by the assignee of the instant invention may suitably be employed in an embodiment for the storage of XML documents implementing data objects and associated traits.

For example, an object of type "document" may be created with a "content" trait and an "authoring" trait. The object holds data related to some file, an instance of the "document" object, that may be stored elsewhere in the system, for example in native, binary large object ("BLOB"), well-known binary data format, or MIME format. In some embodiments, the "content" trait may group data concerning that file (MIME type, size, file reference, file name, or file system metadata, for example), while the "authoring" trait may be associated with data concerning the authoring process of the file (last modified date, last modifier, creation date, creator, or application metadata, for example).

Traits are data definitions well-adapted to be added at runtime, to a data structure such as an object. A trait definition defines the data model, but a trait may also expose services and methods. Adding traits to objects during runtime allows for a flexible database model without the need to define a rigid database structure upfront. Embodiments may further allow for the addition, or modification, of traits on-the-fly without interrupting the continuous use the storage system or database. Other embodiments may limit the interruption of the continuous use to a desired amount, including zero interruption or downtime.

As objects and traits define a data model and expose or implement services or methods, it may be necessary from time to time within an organization to change the data model or associated services or methods to reflect changes, updates, or corrections in the business processes of the owner of a data system or database and the associated applications that are used to operate on and access the data system. These changes may involve, for example, adding traits to an object that previously had no traits. Alternatively, existing traits associated with one or more objects may be changed to reflect changes to business processes or applications, for example by changing the type, or adding data structures, fields, methods, or services.

Accordingly, embodiments may provide for the updating of an object or trait, and a identifying characteristic or version number for the object or trait may be identified, and in the case of a version number, incremented serially when a new version of an object or trait is implemented or deployed in order to assist in the maintenance of a record or log of what changes were made at what time and to otherwise be able to replicate results or states as necessary in the future. As new versions of objects or traits are developed or made necessary by the pertinent business processes he administrator of a data system or database may wish to roll-out a new version of an object or trait without interrupting the continuous use of the data system or database using the object or trait.

Embodiments may provide a database or data system administrator or operator with the ability to describe how the updates to the object or traits should be effected, so that the administrator may dictate a manner of effecting updates that is consistent with the business processes, organizational policies, regulatory or legal framework, and any other relevant criteria or need of the organization. Embodiments provide for a number of predefined alternative update deployment models, or the creation of custom deployment models or systems.ata In certain embodiments, the administrator implementing an update on a data system may be allowed to define the scope and timing of the update in terms of to which objects to the update is propagated. For example, the administrator may elect to have an update effected with respect to a single data object, a group of data objects, or even the entire data repository.

The enhanced techniques described herein allow for dynamic definitions of data objects, or data structures. FIG. 1 illustrates a data object in accordance with some embodiments. The object in FIG. 1 is a "document" object with a "content" trait and an "authoring" trait. The object holds data related to some file that may be stored elsewhere in the system. The "content" trait groups data concerning that file (MIME type, size, file reference, file name), while the "authoring" trait groups data concerning the authoring process of the file (last modified date, last modifier, creation date, creator).

Traits are data definitions designed to be added, at runtime, to a data structure, such as an object. In the example in FIG. 1, the authoring trait and the content trait are data definitions that are added to the document object at runtime. A trait definition defines the data model, but a trait may also expose services and methods. Adding traits to objects during runtime allows for a flexible database model without the need to define a rigid database structure upfront.

Objects and traits may each have a type. Object types may be defined in an XML document, and object type definitions may include a name, a namespace, and a version. FIG. 2 illustrates a data type definition in accordance with some embodiments. The type definition in FIG. 2 defines the name as "document" in the http://www.emc.com/typesystem/def namespace. The version of this definition is 1. Further data type definitions may include event configuration, Java class configuration, and a set of required traits. For example, in FIG. 2, the Java class configuration is com.objects.core.Document. On retrieval of an object of this type, a com.objects.core.Document Java object is instantiated and represents this object in the JVM. The object's document is provided to the instantiation. This allows implementation to setup a binding between the XML document and the Java object representing the object. The type definition in FIG. 2 also includes event configuration. For example, on a "Create" event, the handler on the authoring trait precedes the handler of the content trait. Conversely, on a "Delete" event, the handler on the content trait precedes the one on the authoring trait. In some embodiments, it may be preferable to set restrictions on the object, such as defining which traits can be added to the object.

Figure 10:
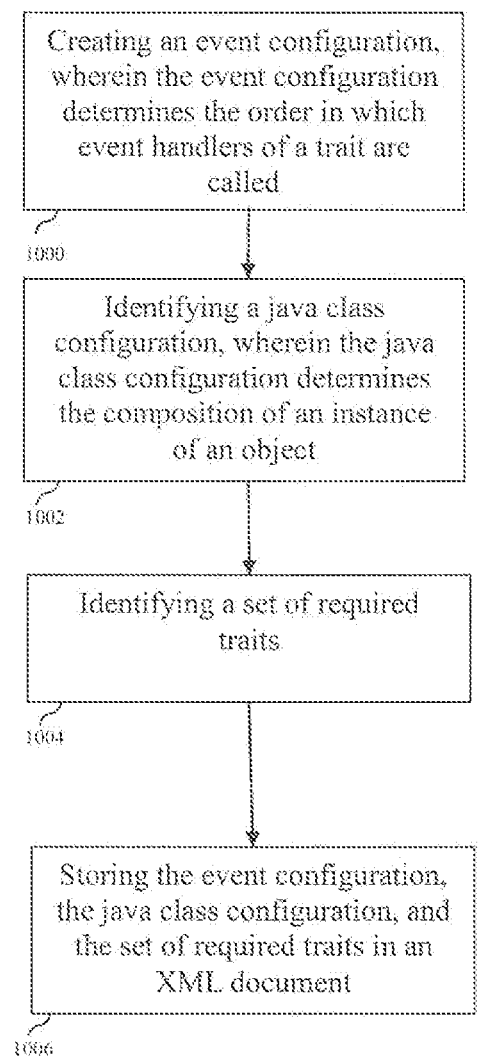
FIG. 10 is a flowchart of a method to organize data in accordance with some embodiments.

FIG. 10 illustrates a method to organize data in accordance with some embodiments. In step 1000, an event configuration is created, wherein the event configuration determines the order in which event handlers of a trait are called. In step 1002, a java class configuration is identified, wherein the java class configuration determines the composition of an instance of an object. In step 1004, a set of required traits is identified. In step 1006, the event configuration, java class configuration, and the set of required traits are stored in an XML document.

In some embodiments, objects themselves contain almost no data and contain no traits. However, in some embodiments, object type definitions may include a set of required traits. A required trait definition may include the name of the trait, the type of the trait, and a property name. The name of the trait is the key to retrieve the instance in the object. The property name is used to generate a getter method in the generated class of the object type.

FIG. 3 illustrates an object in accordance with some embodiments. The patient object includes a base trait and a customer trait. The base trait and the customer trait may be required traits for the patient object. In other words, every instance of the patient object necessarily has these two traits. As illustrated by FIG. 3, each trait provides a different set of services and handles a different set of events. Each trait also inherits a different set of metadata. When the patient object is instantiated, it will call the base trait and a customer trait. Depending on user preference, other traits may be called.

Figure 9:
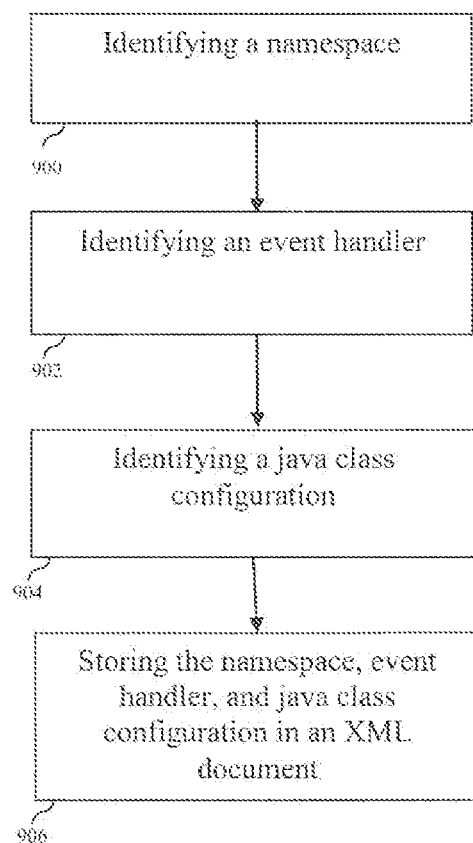
FIG. 9 is a flowchart of a method to organize data in accordance with some embodiments.

FIG. 9 illustrates a method to organize data in accordance with some embodiments. In step 900, a namespace is identified. In step 902, an event handler is identified. In step 904, a java class configuration is identified. In step 906, the namespace, event handler, and java class configuration are stored in an XML document. In other words, a trait definition has been created.

Although a user may add or remove traits from an object at runtime based on user preference, in some embodiments, it may be preferable to restrict or constrain traits for an object. For example, if an administrator of a database did not want users to be able to add a wide range of traits to an object (maybe due to possible performance issues, among others), the administrator may define object types to limit the amount of traits that may be added to an object, may restrict certain traits to certain objects, or may restrict certain traits from certain objects.

FIG. 3 also illustrates a trait definition for each trait. FIG. 4 illustrates a trait definition in accordance with some embodiments. This trait definition defines the name as authoring (e.g. used by the document object in FIG. 1) in its namespace (e.g. between <namespace> tags). The version of this definition is 2 (not to be confused with the version of the XML standard being used). Traits of this type include handlers for Create, Delete, and Update events. On retrieval of a trait of this type, a Java object of <class-configuration> type will be instantiated representing the trait in the JVM. Similarly, when a Create event is raised on this trait, a Java object of " . . . CreateHandler" is instantiated that handles the Create event. Traits, in some embodiments, may also include a schema. A schema may be used for validation of a trait at runtime, and may be referred to by the trait definition through an xsdref element. FIG. 7 illustrates a scheme for the authoring trait in accordance with some embodiments.

Figure 5:
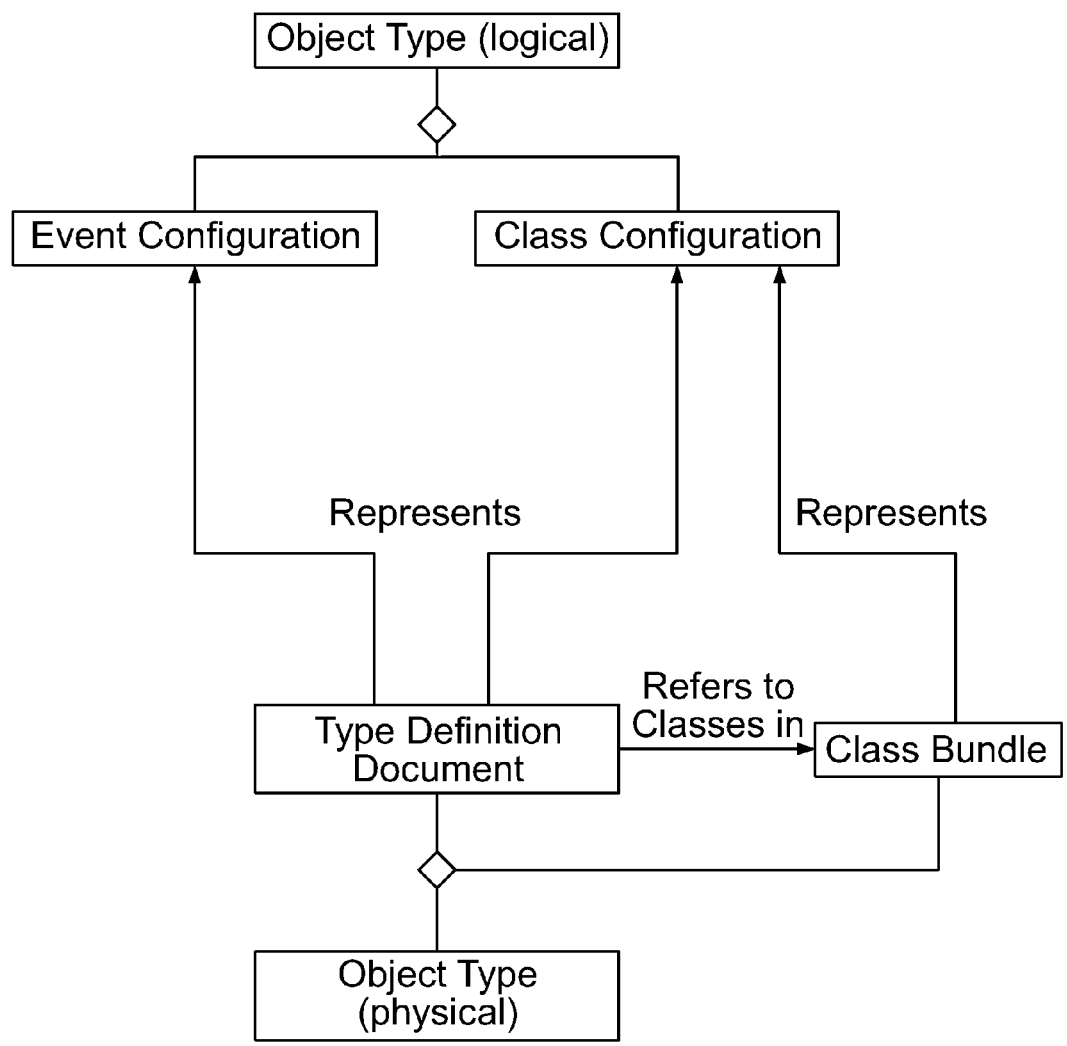
FIG. 5 illustrates the relationship between physical object type, and its logical representation.
Figure 6:
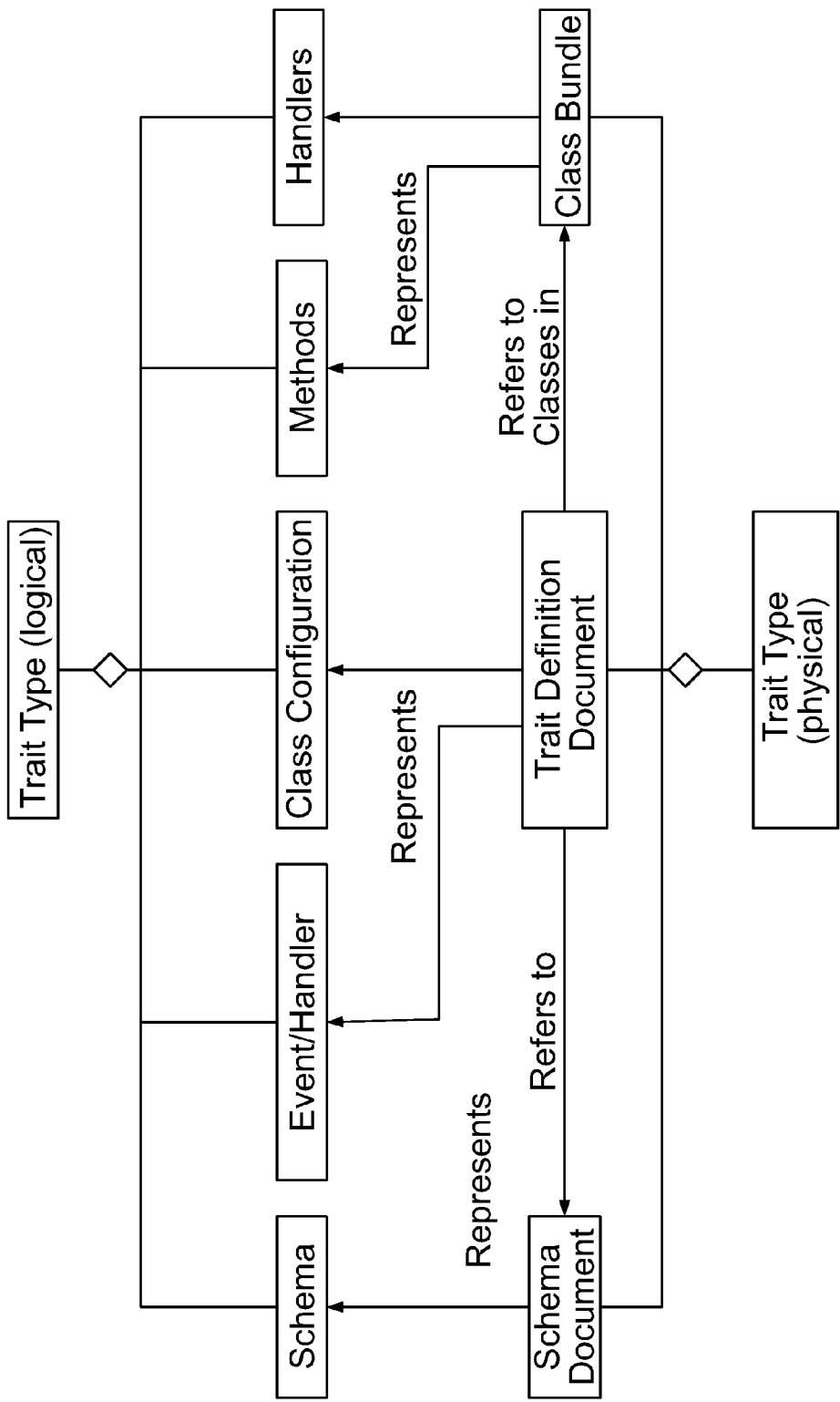
FIG. 6 illustrates the relationship between physical trait type and its logical representation.

FIG. 5 illustrates the relationship between physical object type, and its logical representation. Similarly, FIG. 6 illustrates the relationship between physical trait type and its logical representation.

Figure 8:
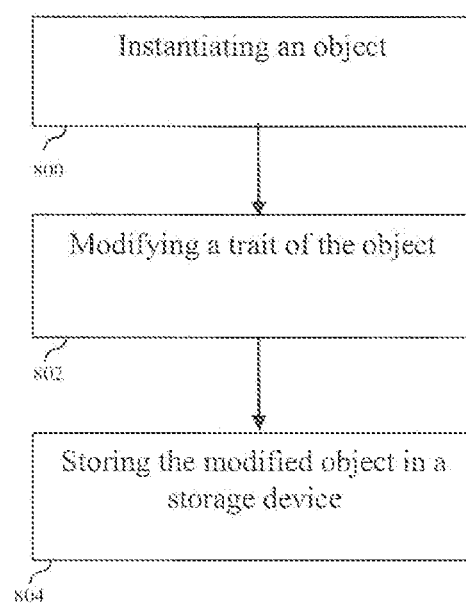
FIG. 8 is a flowchart of a method to organize data in accordance with some embodiments.

FIG. 8 illustrates a method to organize data in accordance with some embodiments. In step 800, an object is instantiated. In step 802, a trait of the object is modified. In step 804, the modified object is stored in a storage device.

Figure 11:
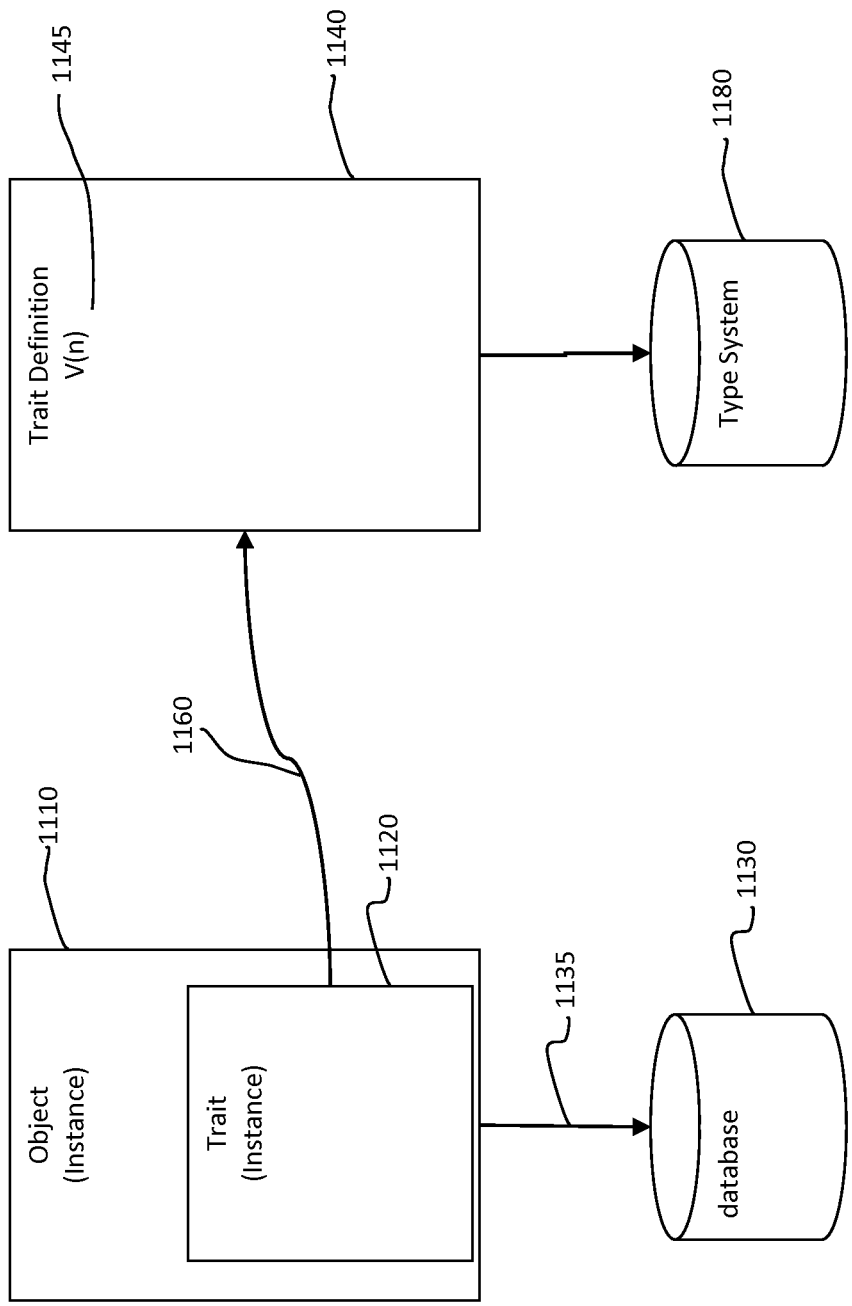
FIG. 11 illustrates a data system in accordance with some embodiments.

FIG. 11 illustrates a data system in accordance with some embodiments. The illustration includes an aspect of the system to update traits for a data system according to some embodiments. An instantiation of an object 1110 may contain zero or more instantiations of traits 1120. Embodiments of the invention may provide for initial traits contained in objects which are empty, and for example may be given a version number of zero or 1. The object 1110 with its associated trait(s) 1120 may be stored in a database 1130, such as an XML object-oriented database, for example, in a way which persists the object 1110 and its component trait(s) 1120, for example, in an object-to-database mapping 1135.

Trait 1120 may be an instantiation of a trait definition 1140, that is, its features may be dictated by the features called for by the trait definition 1140 with which trait 1120 is associated by virtue of association 1160. Trait definition 1140 may be designated has having a version V(n) 1145, in which n may be for example an integer incremented by 1 or other value each time a new version of the trait definition 1140 version 1145 is updated, upgraded, or otherwise modified, for example by the modification of data model, data types, services, methods, functions, or the like. The different version numbers V(n) assigned to serial versions of trait definition 1140 make one trait definition distinguishable from other earlier or later trait definitions 1140 having the same name and being instantiated in one or more objects 1110 that contain or will contain an instantiation of the trait definition 1140 in question. Generally, a trait definition may in some embodiments describe constraints for a class of object parts.

Some embodiments provide that these one or more trait definitions 1140 may be stored in a type system database 1180. Type system database 1180 may be, for example, a component of an object-oriented database, including the sole component of such database. Some embodiments provide that the type system database 1180 is an XML database for storage of XML documents in type system database 1180, by which the XML documents hold or persist the various one or more trait definition versions 1140. The currently-operative version of the trait definition 1140 may vary. For example, in the embodiment of the invention in a multi-tenant or cloud implementation, it may vary by which tenant is using the application or data repository at the time.

Figure 12:
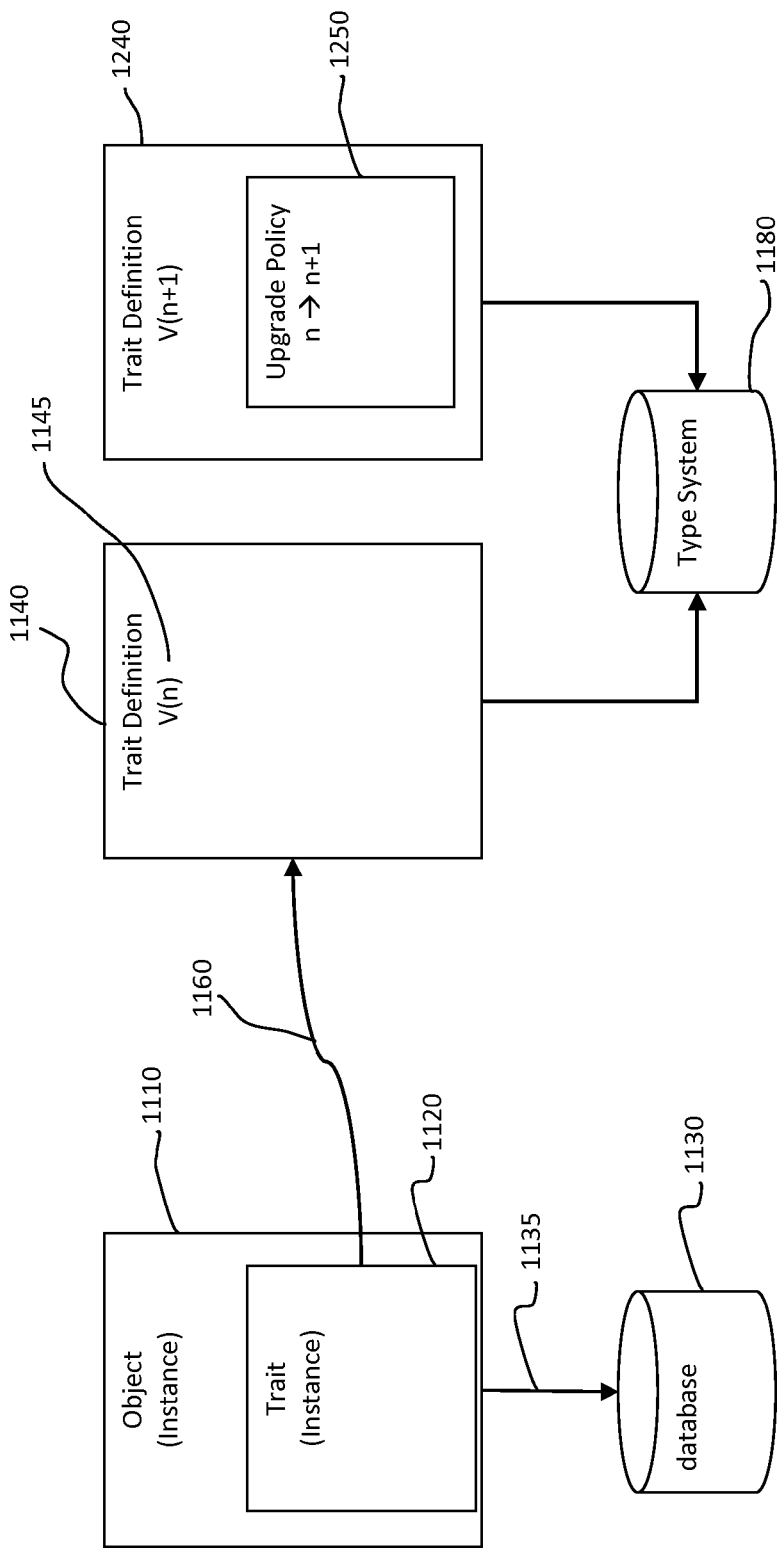
FIG. 12 illustrates a data system in accordance with some embodiments.

FIG. 12 illustrates a data system in accordance with some embodiments. It further illustrates an embodiment of the invention by which a trait definition 1240 may be changed as dictated by business operations or processes, and the changes to the trait definition 1140 may be persisted as a new version V(n+1) 1240 of trait definition 1140, by storing trait definition V(n+1) 1240 as such in type system 1180. In one embodiment of the instant invention, a system is provided by which a data repository administrator may change a type definition 1140 by uploading a new version 1240 of the type definition into type system 1180.

Some embodiments providing for upgrade policies further provide that a trait definition 1240 may be instantiated with an upgrade process or policy 1250 by which the data repository administrators instruct the data repository to implement the upgrade or change from trait definition V(n) 1140 to trait definition V(n+1) 1240 with respect to existing or future instances of the same object instantiated in object 1110, or its constituent traits. Upgrade policy 1250 may be contained in trait definition V(n+1) 1240 or otherwise associated with trait definition 1240 within type system 1180.

By providing for a particular upgrade policy 1250, embodiments of the invention allow an administrator to reduce the impact of trait definition changes by dictating that the changes occur in a manner that will consume the least resources and cause the least inconvenience, within the constraints of the business process logic or other application requirements applicable to the trait, object, and repository.

In some embodiments, the invention provides for the implementation of upgrade policies that permit the dynamic modification of part of, or an entire, persistent object stored in a database. Embodiments of the invention provide for a system by which policies are set for upgrades of object traits, which policy can be applied to an individual object, a set of objects, or the entire data repository and all its constituent objects. The data model change or upgrade or other modification of the selected object or objects, in accordance with the one or more policies, may be effected without taking the data repository offline.

In some embodiments, a trait definition 1140 V(n) 1145 being applied to or embodied in a particular trait instance 1120 may be left unchanged in trait instance 1120 for some period of time, even though the administrator has provided one or more upgraded trait definitions V(n+1) 1240 in the meantime. Upgrade policy 1250 may, for example, provide that trait definition V(n) 1140 as instantiated in trait 1120 should be changed to upgraded definition V(n+1) 1240 synchronously upon access by a user, i.e. only when trait 1120 of object 1110 is retrieved by a user following a search of the database. Under this access policy, the trait 1120 should be upgraded to use or comply with trait definition V(n+1) 1240 the next time the trait of the object is accessed. Alternatively, trait definition V(n) 1140 may be upgraded according to an upgrade policy when trait 1120 and/or object 1110 is responsive to (i.e. is a "hit" with respect to) a search of the database, even if neither trait 1120, object 1110, nor its associated data (such as a document corresponding to metadata stored in or as object 1110), respectively, is retrieved or viewed by the user following the query.

Alternatively, an embodiment may provide for, or allow for configuration providing for, upgrade asynchronously on access. For example, the upgrade of the trait according to the new trait definition may be scheduled to occur in the background, as computing resources permit or at an optimum or convenient time, at some time after the trait of the object is requested, or is accessed.

Furthermore, embodiments may provide for the upgrade of a trait's 1110 trait definition 1140 V(n) 1145 to V(n+m) directly where (n+m)>(n+1), that is, where the trait definition V(n) 1140 for a trait 1120 has not been previously upgraded despite more than one trait definition upgrades being promulgated by the administrator, for example in the case where the conditions for an upgraded trait definition 1240 to be applied to trait 1120 have not been met since an earlier trait definition upgrade (for example, trait definition V(n+1) 1240) had been implemented).

Figure 13:
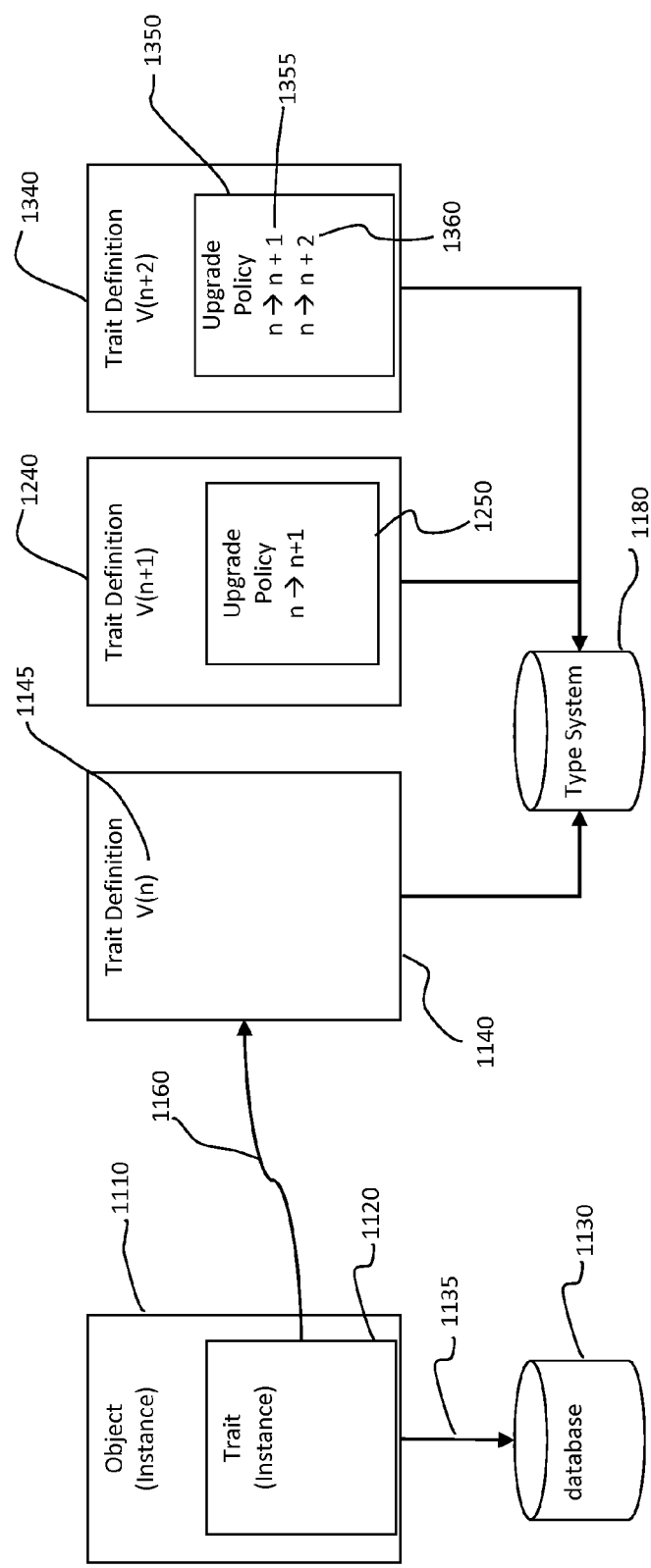
FIG. 13 illustrates a data system in accordance with some embodiments.

FIG. 13 illustrates a data system in accordance with some embodiments, and further illustrates a specific instance of this general case, a scenario in an embodiment when an upgrade policy for a trait definition 1140 is provided directly from an earlier trait definition 1140 to a later trait definition 1340, in the event that the conditions for trait definition upgrade policy n→n+1 1250 were not met before the promulgation of trait definition V(n+2) 1340. As does trait definition 1240, trait definition V(n+2) 1340 has an upgrade policy component 1350 having provision for trait definition upgrades from n+1→n+2 1355 in the event that the trait definition for an trait instance 1120 has been upgraded since an earlier trait definition upgrade 1240 had been promulgated by the administrator. However, this embodiment further provides that upgraded trait definition 1340 has an additional upgrade policy 1350 component 1360, providing for the manner of upgrades directly from trait definition 1140 to trait definition 1340. As were trait definition 1140 and upgraded trait definition 1240, trait definition V(n+2) 1340 may be stored in type system or database 1180. This "direct" upgrade policy 1360 from trait definition V(n) 1140 to trait definition V(n+2) 1340 without application of intervening trait definition V(n+1) 1240 upgrade policy 1250 to trait 1120 may be accomplished as necessary according to the business processes and other characteristics of the business process or domain served by the data repository being administered.

Other embodiments may provide for additional or alternate upgrade policies, for example a policy of upgrading a trait 1120 according to an upgraded trait definition 1240, or later upgraded trait definition, in a batch process. For example, an upgrade policy may provide that a trait be upgraded in the repository even though the trait 1120 of the object 1110, or perhaps even the entire object 1110, has not been recently, or even ever, accessed. Further embodiments may provide for an upgrade policy which provides for upgrades of definitions of traits 1120 as a batch process regardless of whether each or even any trait 1120 corresponding to the trait definition 1140 has been accessed.

An additional embodiment may modify this batch process upgrade policy by blocking access to traits affected by the trait definition upgrade, or by blocking access to entire objects containing traits affected by the trait definition upgrade until such time that the mass upgrade of the affected traits is effected across the entire data repository or some segment of the repository. Another embodiment may provide for an upgrade policy by which certain traits 1120 having a certain trait definition 1140 are not upgraded at any time, even though other traits sharing the same trait definition 1140 may be changed according to one of the other upgrade policies.

Figure 14:
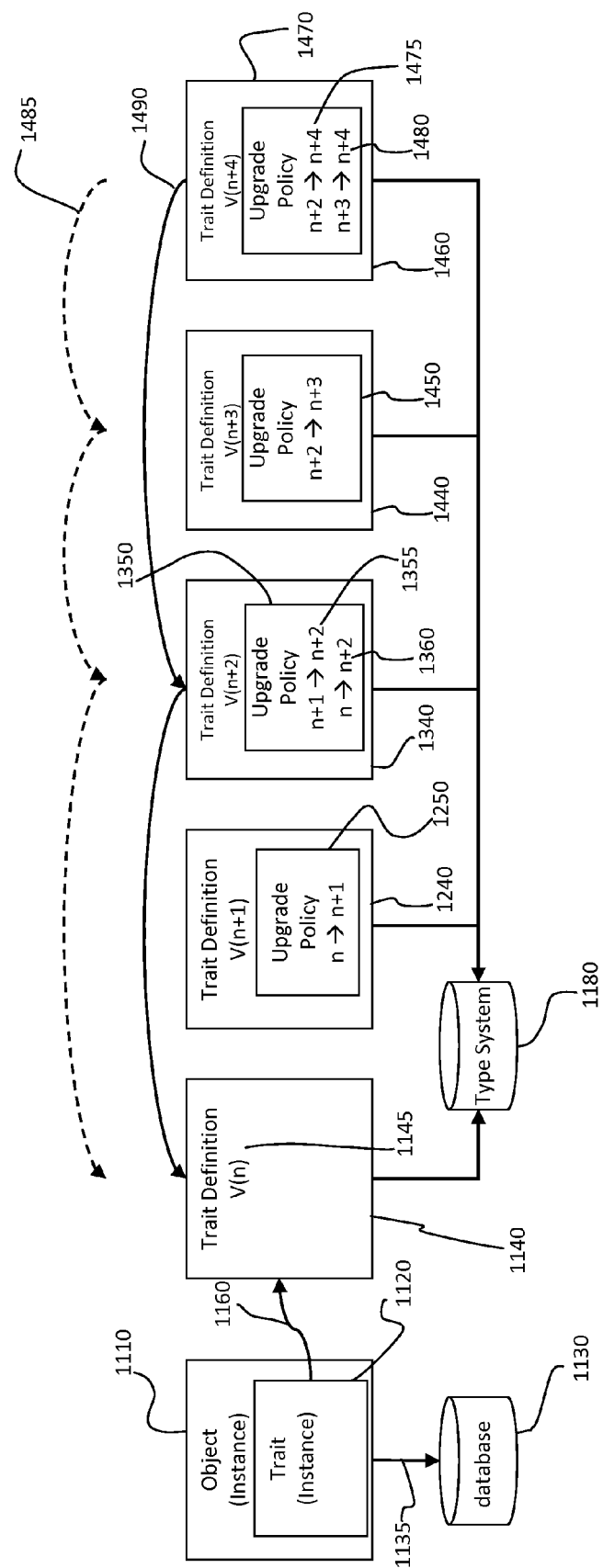
FIG. 14 illustrates a data system in accordance with some embodiments.

An upgrade or modification strategy for versions of the trait definition may provide that a trait definition upgrade may not occur for a particular trait instance for some time, even a very long time, for example in the circumstance that an upgrade policy provides for synchronous upgrade upon access, but the trait instance in question is not accessed by users of the data repository for a long time, e.g. because it is not responsive to a user query or is otherwise not relevant or responsive to user activities. It will be appreciated that under such circumstances, the upgrade policy is able to skip versions of the data models, and by the time an upgrade policy provides for an upgrade, more than a single upgrade may be pending against a particular trait instance. FIG. 14 illustrates one manner of application of more than a single upgrade policy according to an embodiment of the present invention.

When multiple trait definition upgrades are pending simultaneously, it will be appreciated that the set of available upgrade policies may not provide for a direct, or even an indirect, explicit path for upgrade of a trait definition. For example, trait definition 1140 of trait instance 1120 may not have been effected for a period because the trait instance 1120 and/or the object instance 1110 may not have been accessed by a user, while the trait definition upgrade policy provides for upgrade synchronously upon access. If successive trait upgrade policies for upgrade to V(n+1) 1240, V(n+2) 1340, V(n+3) 1440, and finally to V(n+4) 1460, and n+3→n+4 1490 also provide for upgrade upon access, but no access occurs during these successive repository upgrades of the trait definition 1140 generally, at the time that an upgrade policy provides that an upgrade of trait definition 1140 from trait definition V(n) to trait definition V(n+4), or more generally, V(newest), is finally triggered, it may be noted that the administrator may not have provided for a direct upgrade path of trait definition 1140 from version V(n) 1140 to the ultimate current version V(n+4) 1460. Instead, only a few subsidiary upgrades may have been provided by the administrator in the meantime, for example upgrade policy V(n)→(n+1) 1250, V(n+1)→(n+2) 1355, V(n)→(n+2) 1360, V(n+2)→(n+3) 1450, and upgrade policy V(n+2)→(n+4) 1475 and subsidiary upgrades V(n+3)→(n+4) 1480. Under this example, then, if at the time that the upgrade of trait instance 1120 is triggered according to applicable upgrade policies, the administrator has only implemented upgrade policies up to trait definition V(n+2) 1340, trait instance 1140 can be upgraded directly from trait definition V(n) 1145 to trait definition V(n+2) 1340 according to upgrade policy V(n)→(n+2) 1360. If, on the other hand, the administrator has since promulgated upgraded trait definition V(n+4) 1460, there is no direct upgrade policy; rather, the ultimate upgrade of trait instance 1120 from trait definition V(n) 1140 to trait definition V(n+4) 1460 must take place in a series of steps, according to the available upgrade policies implemented by the administrator.

An embodiment of the invention will provide for a stepwise or multi-stage upgrade of trait instance's 1120 trait definition V(n) 1140 according to available trait definition upgrade policy V(n)→(n+2) 1360 (i.e. the upgrade policy by which trait definition V(n) 1140 is upgraded to V(n+2) 1340, and subsequently from trait definition upgrade policy V(n+2)→(n+4) 1475, (i.e., the upgrade policy by which trait definition V(n+2) 1340 is upgraded to V(n+4) 1460), along upgrade path 1690. In many embodiments, it may be disadvantageous and suboptimal to follow an upgrade path with more than the fewest number of hops available from any upgrade path. For example, it will be appreciated that there will often not be any advantage from upgrading trait instance 1120 from trait definition V(n) according to upgrade policy V(n)→(n+2) 1360, then upgrade policy (n+2)→(n+3) 1450, and finally according to upgrade policy V(n+3)→(n+4) 1480, according to upgrade path 1485, as upgrade path 1490 can generally be expected to provide the same upgraded trait definition with less overhead and time. However, embodiments of the instant invention may provide the administrator with an ability to dictate an optimal update path without regard to the number of policy steps in the upgrade path in order to minimize or optimize overhead and other resources according to the available resources and applicable business processes and repository organization.

Figure 15:
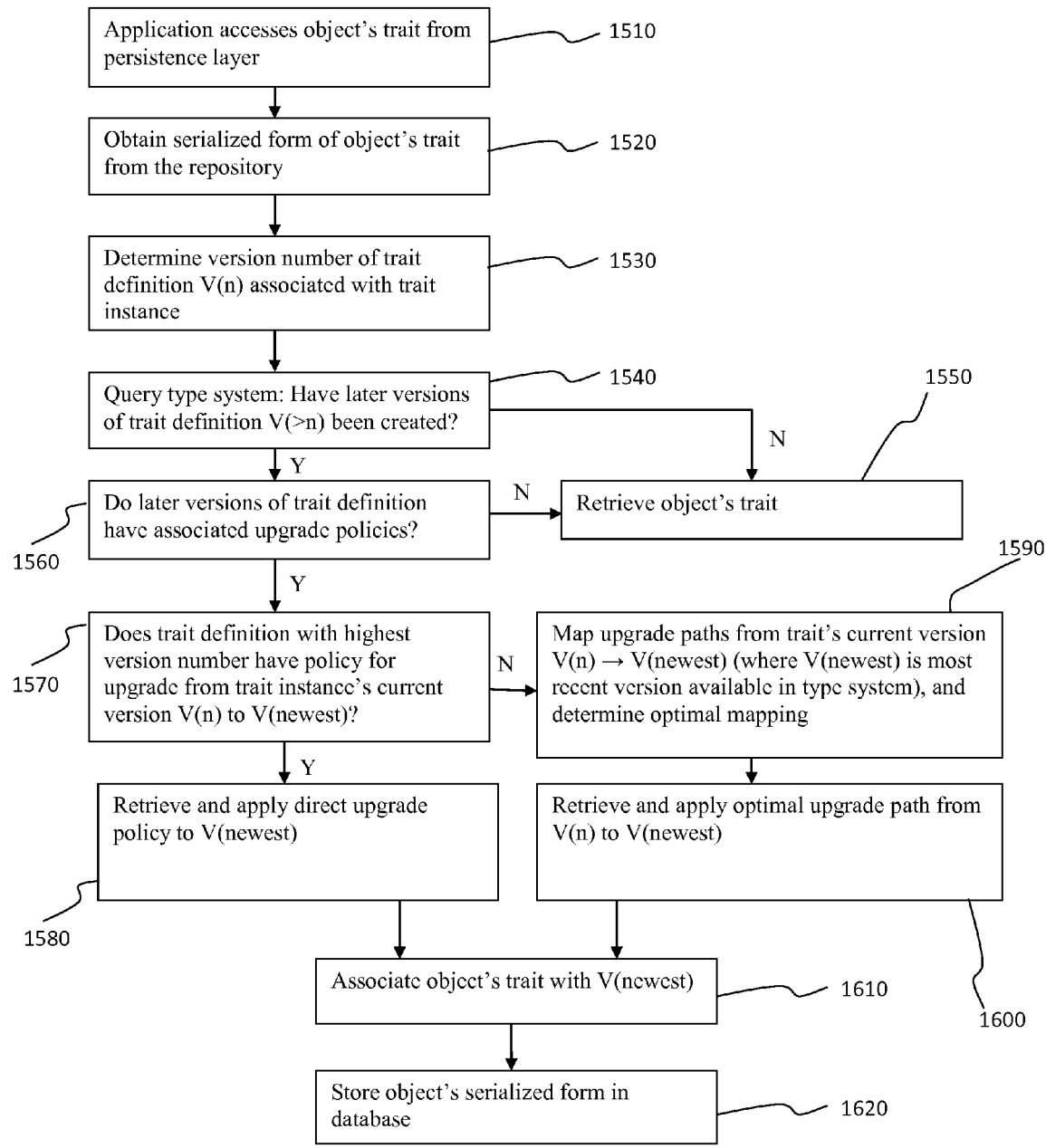
FIG. 15 is a flowchart of the upgrading of data in accordance with some embodiments.

Embodiments of the present invention may provide for a process for accessing and upgrading traits. FIG. 15 is a flowchart of the upgrading of data in accordance with some embodiments. In step 1510, an application, such as a data processing or database application, is directed to access a trait of an object, such as trait 1120 of object 1110 of FIG. 11. The application may access a persistence layer, e.g. a database's persistence layer 1130, in order to access an object or a component trait of the object. Embodiments of the current invention may utilize the following process in order to enable the application to determine whether an upgrade is pending for the object or trait, and if so, how the upgrade should be accomplished, e.g. whether the upgrade should be effected on-the-fly, or as a batch process. Further in step 1510, the object and/or its component trait is accessed from the persistence layer. In another step such as step 1520, the serialized form of the object or component trait of an object is received from the data repository, for example via the DBMS 1130 or other applicable persistence layer.

In step 1530, the trait definition associated with the retrieved trait is determined, for example by examination of the version tag 1145 in FIG. 11 applicable to the trait instance or by examination of the trait definition 1140 associated with the trait via association 1160. Some embodiments provide that the type system 1180 may be queried or polled for the existence of later versions of the trait definition, in step 1540, i.e. typically trait definitions have a higher version number than the version number of the current trait definition associated with the trait being accessed in step 1510. So the existence of higher version numbers for a trait definition in step 1540 may generally indicate the existence of later versions. If no later versions are associated with the trait definition, the object's trait may be retrieved in step 1550 via "N" ("no") branch 1545.

If later versions are available, in step 1560 the trait definition of the later version or versions of the trait definitions (e.g. FIG. 14 trait definitions 1240, 1340, 1440, and 1460) may be inspected, for example to determine whether there are embedded or otherwise associated upgrade policies with such later version(s). If there are upgrade policies available (e.g. FIG. 14 upgrade policies 1250, 1350, 1450, and 1470), then in step 1570 the upgrade policy of the latest or most recent version V(newest) (i.e., the most recent version available in type system 1180, trait definition V(n+4) 1460 in FIG. 14) of the trait definition from the type system 1180 may be inspected to see whether that trait definition version contains a policy for direct upgrade to that latest version from the version instantiated in the objects' trait. If such a direct upgrade policy or method is provided for by the most recent version V(newest), this policy may be retrieved and applied to the trait in step 1580. If no direct upgrade policy is provided from the trait's current trait definition version to the most current trait definition version, the optimal upgrade path for the upgrade of the trait's trait definition from V(n) currently instantiated to V(newest) may be mapped in step 1590. This upgrade mapping may further be applied in step 1600 to upgrade the trait's trait definition to the current latest trait definition V(newest). In step 1600, the selected upgrade policies are retrieved, including their associated upgrade code or script implementing the business process or other calculation changes implemented in the various trait definition upgrades, and applied to the trait in order from oldest to newest in order to update the trait's trait definition to the most recent trait definition V(newest). In this manner embodiments of the invention may be used to create a serialized version of the trait or the object which is valid and meets the definitions, constraints, datatypes, and/or processes of the most recent version of the trait definition.

Since the trait has been updated to be consistent with the most recent trait definition V(newest), in step 1610 the object's trait may be associated with the new latest version of the trait definition so that when the trait is accessed later, it will be known via association 1160 of FIG. 14 that the trait complies with the most recent trait definition, or, if intervening changes to the trait definition have been made, it can be determined what upgrade steps or upgrade path is appropriate to again bring the trait into compliance with the most recent trait definition version. In step 1620, the object's serialized form, including the updated trait corresponding to the trait definition, is stored in the database. Finally, embodiments may provide for the instantiation of the object's trait according to the upgraded/migrated data model.

For the sake of clarity, the processes and methods herein have been illustrated with a specific flow, but it should be understood that other sequences may be possible and that some may be performed in parallel, without departing from the spirit of the invention. Additionally, steps may be subdivided or combined, or processes may invoke other processes to handle certain tasks. References herein to "services," "processes," "methods," "tasks," and similar terms should be understood as encompassing services, methods, applications, applets, functions, modules, daemons, scripts, tasks, and other computer processes, however denominated. While some processes or methods may be described as "expecting," "desiring," or "accepting" certain information or results, or more generally performing an action (e.g. "obtaining"), it will be appreciated by those skilled in the art that that these processes need not be sentient or have consciousness or agency, rather, anthropomorphic language indicating expectations or wishes is intended only to illustrate that the process or method may be designed to process or use certain types of arguments, or data having certain qualities or types, and that other arguments or data may result in error, failure, exception, overflow, abnormal termination, abend, or "crash;" or otherwise unexpected, inaccurate, undesirable, or suboptimal results or output. As disclosed herein, software written in accordance with the present invention may be stored in some form of computer-readable medium, such as memory or CD-ROM/optical media, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers, processors, or partitions such that, as a whole, they perform the functions of the components identified herein; i.e. they take the place of a single computer. Various functions described above may be performed by a single process or groups of processes, on a single computer or distributed over several computers. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for updating one or more instances of a data object stored in a data repository, comprising:

receiving an upgrade to a definition of a first trait, wherein the first trait relates to a data definition associated with a data structure of one or more data objects stored in the data repository, wherein a first instance of the data object is associated with a first instance of the first trait and a second instance of the data object is associated with a second instance of the first trait, wherein the first instance of the first trait is related to a characteristic of the first instance of the data object and the second instance of the first trait is related to a characteristic of the second instance of the data object, wherein each of the first and the second trait instance comprises an instance of the first trait definition prior to the upgrade, wherein the first trait definition prior to the upgrade includes a data structure that indicates one or more data fields associated with the data object, and wherein the upgraded first trait definition includes at least one modification to the data structure included in the first trait definition prior to the upgrade;

storing the upgraded first trait definition;

detecting a user's interaction with the first trait instance associated with the first data object instance but not with the second trait instance associated with the second data object instance;

accessing, in response to the detecting the user's interaction with the first trait instance, the first trait instance associated with the first data object instance but not accessing the second trait instance associated with the second data object instance;

determining a version characteristic of a data structure included in the first trait instance;

determining, based at least in part on the version characteristic, that the upgraded first trait definition includes a more recent version of the data structure included in the first trait instance; and modifying the data structure included in the first trait instance but not a data structure included in the second trait instance based at least in part on the upgraded first trait definition, wherein the modifications includes at least one change to a number of data fields, or to a type or other attribute of a data field included in the first trait instance's data structure.

2. The method as recited in claim 1, wherein modifying the first trait instance's data structure based at least in part on the upgraded first trait definition comprises:
   identifying a first set of update policies available from the data repository that effect the more recent version of the first trait instance's data structure;
   identifying a second set of update policies provided by the data repository one or more of which may be applied to effect the modification of the first trait instance's data structure from its current version to a version to which a policy from the first set of update policies may be applied;
   applying one or more update policies from the second set of update policies to the first trait instance's data structure;
   applying an update policy from the first set of update policies to the first trait instance's data structure.

3. The method as recited in claim 2, further comprising the step of identifying a subset of the second set of update policies to the first trait instance's data structure that provides an optimized update path.

4. The method as recited in claim 3, wherein the step of identifying a subset of the second set of update policies minimizes the number of update policies from the second set to be applied.

5. The method as recited in claim 1, further comprising the steps of:
   obtaining the serialized form of the first trait from the repository; and
   storing the updated serialized form of the first trait in the repository.

6. The method as recited in claim 1, wherein the first and the second instance of the data object is each associated, respectively, with a first and a second instance of a second trait definition, and wherein the second trait definition includes a data structure that includes services.

7. The method of claim 6, further comprising the step of:
   detecting the user's interaction with the first instance of the second trait but not with the second instance of the second trait;
   selecting and applying update policies in order to minimize a number of update policies which must be applied to the first instance of the second trait in order to achieve compliance with an upgraded second trait definition.

8. The method of claim 2, wherein applying one or more policies from the second step of update policies to the first trait instance's data structure comprises selecting and applying the smallest number of update policies necessary to effect update of the first trait instance's data structure to a form that can be acted on by an update policy from the first set of update policies.

9. The method of claim 5, wherein the accessing the first trait instance includes accessing the serialized form of the first trait.

10. The method of claim 9, further comprising storing the modified first trait instance associated with the first data object instance in serialized form.

11. A system for updating one or more instances of a data object stored in a storage device, comprising a processor configured to:
   receive an upgrade to a definition of a first trait, wherein the first trait relates to a data definition associated with a data structure of one or more data objects stored in the data repository, wherein a first instance of the data object is associated with a first instance of the first trait and a second instance of the data object is associated with a second instance of the first trait, wherein the first instance of the first trait is related to a characteristic of the first instance of the data object and the second instance of the first trait is related to a characteristic of the second instance of the data object, wherein each of the first and the second trait instance comprises an instance of the first trait definition prior to the upgrade, wherein the first trait definition prior to the upgrade includes a data structure that indicates one or more data fields associated with the data object, and wherein the upgraded first trait definition includes at least one modification to the data structure included in the first trait definition prior to the upgrade;
   store the upgraded first trait definition;
   detect a user's interaction with the first trait instance associated with the first data object instance but not with the second trait instance associated with the second data object instance;
   access, in response to the detecting the user's interaction with the first trait instance, the first trait instance associated with the first data object instance but not accessing the second trait instance associated with the second data object instance;
   determine a version characteristic of a data structure included in the first trait instance;
   determine, based at least in part on the version characteristic, that the upgraded first trait definition includes a more recent version of the data structure included in the first trait instance; and
   modify the data structure included in the first trait instance but not a data structure included in the second trait instance based at least in part on the upgraded first trait definition, wherein the modifications includes at least one change to a number of data fields, or to a type or other attribute of a data field included in the first trait instance's data structure.

12. A computer program product for updating one or more instances of a data object stored in a repository, comprising a non-transitory computer readable medium having program instructions embodied therein for:
   receiving an upgrade to a definition of a first trait, wherein the first trait relates to a data definition associated with a data structure of one or more data objects stored in the data repository, wherein a first instance of the data object is associated with a first instance of the first trait and a second instance of the data object is associated with a second instance of the first trait, wherein the first instance of the first trait is related to a characteristic of the first instance of the data object and the second instance of the first trait is related to a characteristic of the second instance of the data object, wherein each of the first and the second trait instance comprises an instance of the first trait definition prior to the upgrade, wherein the first trait definition prior to the upgrade includes a data structure that indicates one or more data fields associated with the data object, and wherein the upgraded trait definition includes at least one modification to the data structure included in the first trait definition prior to the upgrade;
   storing the upgraded first trait definition;
   detecting a user's interaction with the first trait instance associated with the first data object instance but not with the second trait instance associated with the second data object instance;

accessing, in response to the detecting the user's interaction with the first trait instance, the first trait instance associated with the first data object instance but not accessing the second trait instance associated with the second data object instance;

determining a version characteristic of a data structure included in the first trait instance;

determining, based at least in part on the version characteristic, that the upgraded first trait definition includes a more recent version of the data structure included in the first trait instance; and modifying the data structure included in the first trait instance but not a data structure included in the second trait instance based at least in part on the upgraded first trait definition, wherein the modifications includes at least one change to a number of data fields, or to a type or other attribute of a data field included in the first trait instance's data structure.

13. The system as recited in claim 11, wherein to modify the first trait instance's data structure based at least in part on the upgraded first trait definition, the processor is configured to:

identify a first set of update policies available from the data repository that effect the more recent version of the first trait instance's data structure;

identify a second set of update policies provided by the data repository one or more of which may be applied to effect the modification of the first trait instance's data structure from its current version to a version to which a policy from the first set of update policies may be applied;

apply one or more update policies from the second set of update policies to the first trait instance's data structure;

apply an update policy from the first set of update policies to the first trait instance's data structure.

14. The system as recited in claim 13, wherein the processor is further configured to identify a subset of the second set of update policies to the first trait instance's data structure that provides an optimized update path.

15. The system as recited in claim 14, wherein identifying the subset of the second set of update policies minimizes the number of update policies from the second set to be applied.

16. The system as recited in claim 13, wherein to apply one or more policies from the second step of update policies to the first trait instance's data structure, the processor is further configured to select and apply the smallest number of update policies necessary to effect update of the first trait instance's data structure to a form that can be acted on by an update policy from the first set of update policies.

17. The system as recited in claim 11, wherein the first and the second instance of the data object is each associated, respectively, with a first and a second instance of a second trait definition, and wherein the second trait definition includes a data structure that includes services.

* * * * *